455-601 AU 233 EX

FIP3106 OR 3,705,307

United States Patent [15] 3,705,307

Reeves et al. [45] Dec. 5, 1972

[54] OPTICAL REPEATER WITH PHASE ERROR CORRECTION

[72] Inventors: Alec Harley Reeves, Harlow; Melvin Murray Ramsay, Broxbourne; Anthony Edmund Mounter; Simon French Laurence, both of Harlow, all of England

[73] Assignee: International Standard Electric Corporation, New York, N.Y.

[22] Filed: May 22, 1970

[21] Appl. No.: 39,833

B 5-30-61

[52] U.S. Cl. ....................250/199

[51] Int. Cl. ....................H04b 9/00

[58] Field of Search ...250/199; 331/94.5; 330/4, 4.3; 332/7.51; 325/13, 350, 443

[56] References Cited

UNITED STATES PATENTS 3,085,200 4/1963 Goodall....................325/13

OTHER PUBLICATIONS

G. J. Lasher et al., Mutually Quenched Injection Lasers, IBM Journal, Sept. 1969, pp. 471–475.

*Primary Examiner*—Albert J. Mayer
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A phase modulated pulsed carrier wave transmission system wherein binary information is conveyed in the form of pulses such that the significance of each signal pulse is represented by the phase of the carrier. An optical frequency repeater for the system employs self-quenching super-regenerative devices to correct phase errors in the pulses before they are relayed down the system.

5 Claims, 7 Drawing Figures

G 2025 920

Inventors
ALEC H. REEVES
MELVIN M. RAMSAY
ANTHONY E. MOUNTER
SIMON F. LAURENCE
By Philip M. Bolton
Attorney Inventors
ALEC H. REEVES
MELVIN M. RAMSAY
ANTHONY E. MOUNTER
SIMON F. LAURENCE
By
Attorney Inventors
ALEC H. REEVES
MELVIN M. RAMSAY
ANTHONY E. MOUNTER
SIMON F. LAURENCE
By Philip M. Bolton
Attorney Inventors
ALEC H. REEVES
MELVIN M. RAMSAY
ANTHONY E. MOUNTER
By SIMON F. LAURENCE
Attorney Inventors
ALEC H. REEVES
MELVIN M. RAMSAY
ANTHONY E. MOUNTER
SIMON F. LAURENCE
By Philip M. Bolton
Attorney

OPTICAL REPEATER WITH PHASE ERROR CORRECTION

BACKGROUND OF THE INVENTION

This invention relates to a pulse transmission system and in particular to a phase modulated pulsed carrier wave transmission system.

Summary of the Invention

According to the invention there is provided a phase modulated pulsed carrier wave transmission system for conveying binary information in the form of pulses such that the significance of each signal pulse is represented by the phase of the carrier within the envelope of that pulse measured with respect to a reference wave of the same frequency as that of the carrier, comprising a source of a signal pulse train having synchronizing pulses interspersed at regular intervals with information pulses, said synchronizing pulses all having the same phase, and at least one repeater for regenerating said pulse train further comprising means for converting part of the phase jitter of incoming pulses into amplitude jitter whereby cumulative phase errors in the regeneration of pulses by said repeater is avoided.

The concept of phase modulation is a pulsed carrier wave is illustrated with reference to FIGS. 1(*a*) and 1(*b*). A reference wave of the same wavelength as the modulated carrier wave is represented in FIG. 1(*a*), while two pulses in a phase modulated pulsed carrier wave are represented in FIG. 1(*b*). Phase is a comparative measure requiring some reference or datum to measure from. In this instance the measurement of phase is related to the notional reference wave. At a repeater, reference signals are used to construct a local reference wave in phase with the notional reference wave. This local reference wave need not be a continuous wave so long as it includes portions which are contemporaneous with the information signals. These pulses of FIG. 1(*b*) are seen to represent unlike digits because they bear a different phase relationship with the notional reference wave, thus within the envelope of the first pulse the carrier is in phase with the notional reference wave while within the envelope of the second it is in anti-phase. Therefore FIG. 1(*b*) is seen to depict a system in which the phase angle separation between unlike digits is $\pi$. This form of modulation, which will hereinafter be termed pulse phase modulation, can readily be relayed by self-quenching super-regenerative oscillators because such devices have the property that they can be triggered at an appropriate part of their pulsing cycle by a trigger pulse whose carrier wave has the same frequency as the frequency of the oscillator, and under these circumstances it is found that the oscillator is fired with the phase of the trigger pulse.

It will be observed that compared with some pulse transmission systems pulse phase modulation makes slightly more extravagent use of bandwidth owing to the restricted duty cycle that is achievable with any form of self-quenching super-regenerative oscillator. At optical and quasi-optical frequencies however considerations of the efficiency of use made of available bandwidth are not generally of paramount importance, and in consequence pulse phase modulation can offer significant advantages at these frequencies arising from the comparative simplicity afforded by the use of self-quenching super-regenerative oscillators.

The invention also provides a repeater for a phase modulated pulsed carrier wave transmission system employing one or more self-quenching super-regenerative oscillators and including phase reconstituting means which is constructed to transform at least a proportion of phase jitter in the incoming pulses into amplitude jitter which is then eliminated by a high level clipper.

If the phase angle separation between unlike digits is designed to be $\pi/2$ the phase reconstituting means of a repeater may consist of three stages. The first stage consists of a high level clipper to eliminate amplitude jitter from the incoming signal pulses. The second stage consists of phase changing means in which the phases of the incoming pulses, as determined with reference to a notional reference wave of the same wavelength as the modulated carrier, are changed by the addition of a pulse modulated carrier wave signal bearing a fixed phase relationship with the notional reference wave, the amplitude and phase of this signal being chosen such that at least a proportion of any phase jitter in the input from the first stage is transformed into amplitude jitter in the resultant. And the third stage consists of a high level clipper for eliminating the amplitude jitter from the output of the second stage.

It will be shown that this form of repeater reconstitutes the pulses with a reflection of phase, so that pulses are only restored to their original phase relationship after passing through an even number of such repeaters.

Since better noise discrimination is afforded by designing the system for maximum phase angle separation between unlike digits, a phase angle separation of $\pi$ may be preferred, in which case the phase reconstituting means requires three additional stages. The first two of these additional stages precede the first stage and consist of a high level clipper stage followed by a phase changing stage in which the phase angle separation between unlike digits is reduced by the addition of a pulse modulated carrier wave signal bearing a fixed phase relationship with the notional reference wave, the amplitude and phase of this signal being chosen such that the reduction in phase angle separation is from $\pi$ to $\pi/2$. The third, and final, additional stage follows the third stage, and consists of phase changing means in which the phase angle separation between unlike digits is increased by the addition of a pulse modulated carrier wave signal bearing a fixed phase relationship with the notional reference wave, the amplitude and phase of this signal being chosen such that the increase in phase angle separation is from $\pi/2$ back again to $\pi$. It will be evident that this form of repeater with the three additional stages may be used, with a suitable choice of the amplitudes and phases of the pulse modulated carrier wave signals, for any phase modulated pulsed carrier wave transmission system having an arbitrary but predetermined phase angle separation between unlike digits.

It will also be evident that in any such system the third additional stage may be constructed in such a manner that the repeater reconstitutes the pulses without any reflection of phase so that pulses are restored to their original phase relationship at every repeater.

The high level clippers referred to above may conveniently be provided by self-quenching super-regenerative oscillators due to their inherent operational characteristics.

In common with more conventional oscillators the amplitude of output of a self-quenching super-regenerative oscillator is dependent upon the saturation/feedback characteristic of the oscillator and is quite independent of the amplitude of any stimulus initially used to excite it into oscillation. This production of a fixed amplitude output in response to a variable amplitude input is equivalent to high level clipping, and hence the high level clippers referred to above may conveniently be provided by self-quenching super-regenerative oscillators.

Preferably the phases of the modulated signal pulses with respect to the notional reference wave are rendered ascertainable at each repeater and at the receiver of the transmission system by means of synchronizing pulses within whose envelopes the carrier wave is in phase with the notional reference wave, these synchronizing pulses being transmitted over the signal channel of the transmission system at regular intervals in the signal pulse train.

When the frequency of the carrier wave is a light wave of optical or quasi-optical frequency the separation of such synchronizing pulses from the phase modulated signal pulses may be achieved by arranging for a proportion of the light to be incident upon a Fabry Perot etalon whose fundamental resonance is equal to the p.r.f. of the synchronizing pulses. Portions of a reference wave in phase with the notional reference wave may then be constructed by causing the synchronizing pulses to energize a further Fabry Perot etalon whose fundamental resonance is equal to the overall p.r.f. of the system. The pulse modulated carrier wave signals employed in the phase changing means may then be derived from another self-quenching super-regenerative oscillator which is triggered by light from this second Fabry Perot etalon.

The foregoing and other features of the invention will be evident from the following description of an optical pulse phase modulation transmission system embodying the invention in a preferred form. The description refers to the drawings accompanying the provisional Specification in which:

Figure 1:
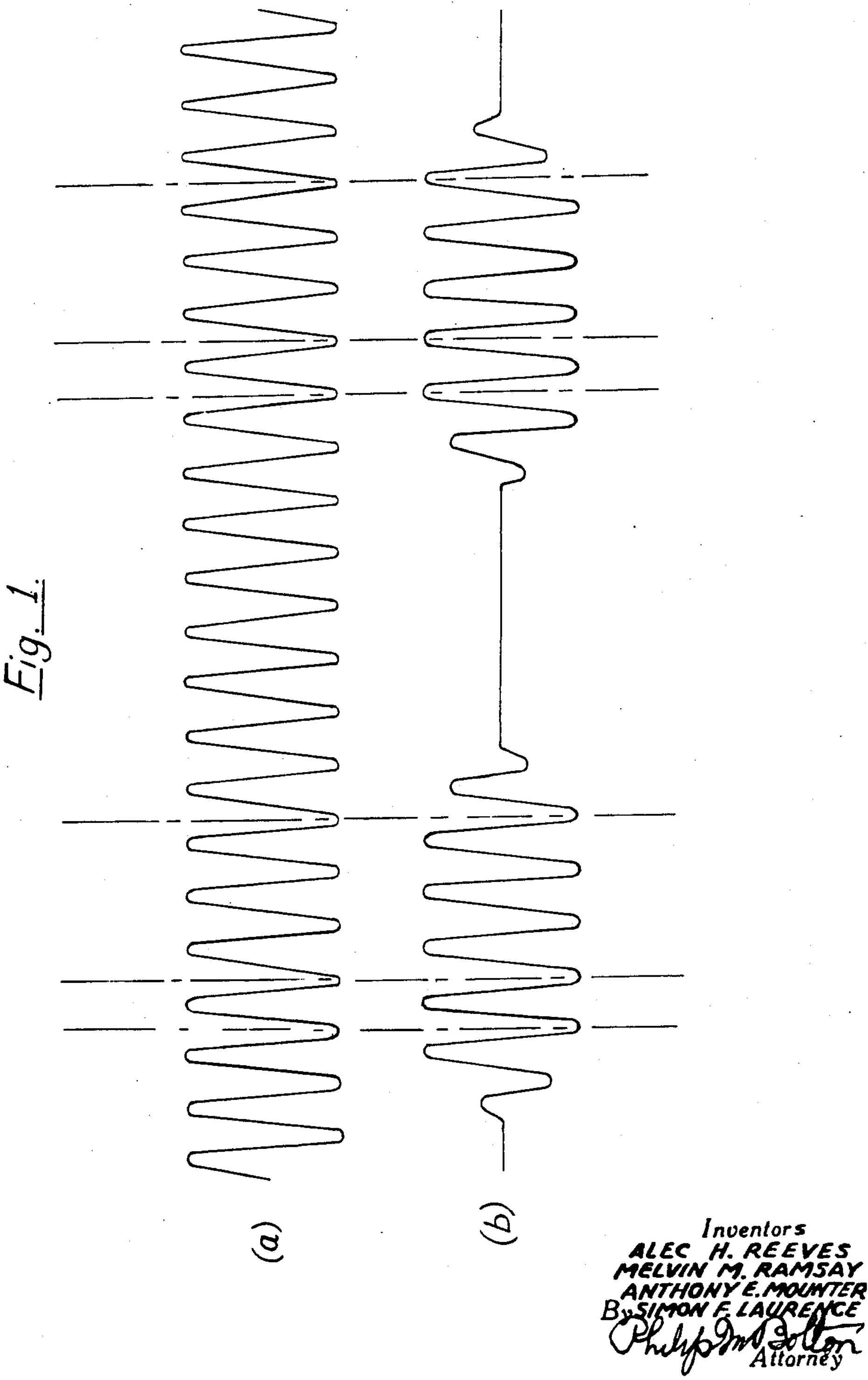
FIGS. 1(*a*) and 1(*b*) depicts a notional reference wave and phase modulated pulsed carrier wave respectively

Since the embodiment of this invention relies on the use of super-regenerative self-quenching (SQSR) oscillators consideration will first be given to the nature of such devices.

The mathematical analysis of the principles of operation of SQSR oscillators are known, and it will be evident that these principles are applicable to the construction of such oscillators to work at optical frequencies. One way of describing the operation of an SQSR oscillator is to say that it is an oscillator with a time varying damping factor. In order to be self-quenching this damping factor must be produced internally by the oscillator and be a retarded function of its output. This requires that the equation governing the operation of the device be a second order non-linear differential equation.

A laser, which constitutes a simple optical oscillator, can in principle be converted to a SQSR mode of operation by incorporating a feedback loop into the drive of the laser so that the drive is modified by the output. This would require the use of some form of photosensor, and there would also have to be some form of delay in the feedback loop to provide the required squegging waveform. It would be difficult and costly to achieve with this type of SQSR device a p.r.f. in excess of about 1 GHz, the p.r.f. being essentially limited by the rise and fall times of the laser drive waveform. This problem can be circumvented by employing a steady drive condition for the laser and using optical feedback to promote SQSR operation. The fact that optical feedback can be used to secure this effect arises at least in part because of the delay introduced by the Q and the transit time of the laser cavity, and because the ratio of population inversion and the rate of build up of light within the cavity are both functions which are dependent upon the optical field existing in the cavity. Hence it can be seen that by providing an optically non-linear attenuating device in an optical feedback path, a laser with a steady drive can be caused to operate in an SQSR mode. The non-linear attenuating device can be formed by one of the known substances whose attenuation is bleached under the action of intense light, but where the lasing device is a semiconductor injection diode it may be preferred to use the same type of device for the non-linear attenuator. In these circumstances the semiconductor diode which is being used as a non-linear attenuator may itself be electrically powered so as to reduce the optical field required to bleach it. Any drive of this sort to this diode must be significantly beneath its lasing threshold so that in the absence of any external optical stimulation it is unable to lase. Under these circumstances the effect of illuminating the diode with light of the appropriate wavelength is to stimulate transitions between the two energy states which determine its lasing wavelength. Since initially there will be a greater population of the lower state there will be a net absorption of energy from the incident illumination. If the illumination is strong enough to swamp the spontaneous transitions the condition will be reached in which the two populations are equal, whereupon the probability of an incident photon stimulating a transition from the lower to the higher energy state becomes equal to its probability of stimulating a transition in the reverse direction. Under these circumstances the diode is rendered statistically transparent.

Figure 2:
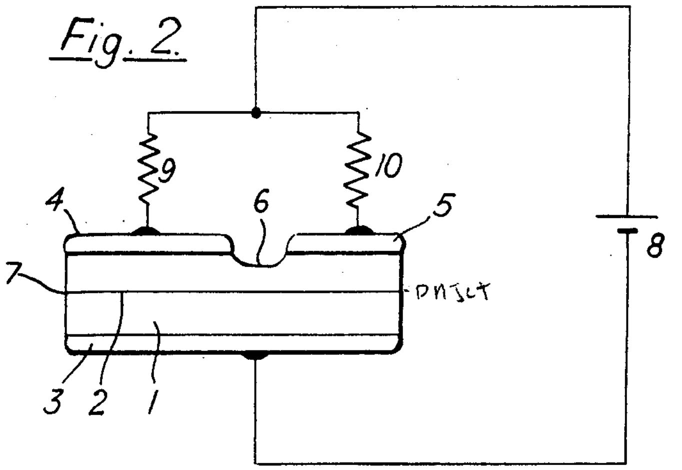
FIG. 2 depicts a semiconductor laser capable of operation in a self quenching super-regenerative mode.

From the foregoing discussion it will be evident that it is possible to construct an optical SQSR oscillator by the optical coupling of two semiconductor injection laser diodes. In operation both diodes are subjected to a steady drive, but the drive for one diode is arranged to be sufficient to cause it to lase, while the other is deliberately arranged to be insufficient to cause it to lase without any additional external influence. There is experimental reason to believe that there is no need for there to be two physically discrete laser cavities, for it appears that at least under certain conditions it may be sufficient to employ a single laser constructed in such a way that the current density across the p-n junction over one part of the length of the cavity can be made to be less than that over another part. Referring now to FIG. 2, one way of achieving this is to divide, for instance by means of a saw cut, one of the electrode layers of the device into two parts. Then, by making separate connections to the two parts, the current density across the p-n junction over one part of the length of the laser cavity can be made to be less than that over another part. Such a device can then be powered in the manner depicted schematically in FIG. 2. In FIG. 2 the die of semiconductive material is shown at 1; its p-n junction at 2. One of the metal electrode layers is shown at 3, while the other is divided into two parts 4 and 5 by means of a channel 6 formed parallel with the reflecting end faces 7 of the laser. The two parts of the laser are connected to a common power supply 8, depicted schematically by the symbol for a battery, through resistors 9 and 10 whose values are chosen so that the current density through that part of the laser lying under electrode 4 is greater than that lying under electrode 5. The reasons for such a device to operate in an SQSR mode are not fully understood.

The initial transmitter of the transmission system consists simply of a mode locked laser followed by an electro-optic phase plate. Preferably this laser should be of the internally mode locking type so that no base band signals are required. The mode locked laser produces phase coherent pulses at regular intervals, but before they are sent down the system they pass through an electro-optic crystal so that individual pulses can be retarded by an extra half a wave length by the application of an appropriate potential across the crystal.

Next to be considered is a method for reconstituting the phase of the pulses that pass through a repeater. In general the pulses arriving at a repeater will reach it with a certain amount of amplitude jitter and also a certain amount of phase jitter. The removal of the amplitude jitter is a relatively simple matter requiring merely the use of a high level clipper such as may conveniently be provided by an SQSR oscillator. On the other hand the elimination of phase jitter is rather more involved and will now be discussed with reference to FIGS. 3, 4 and 5.

Figure 3:
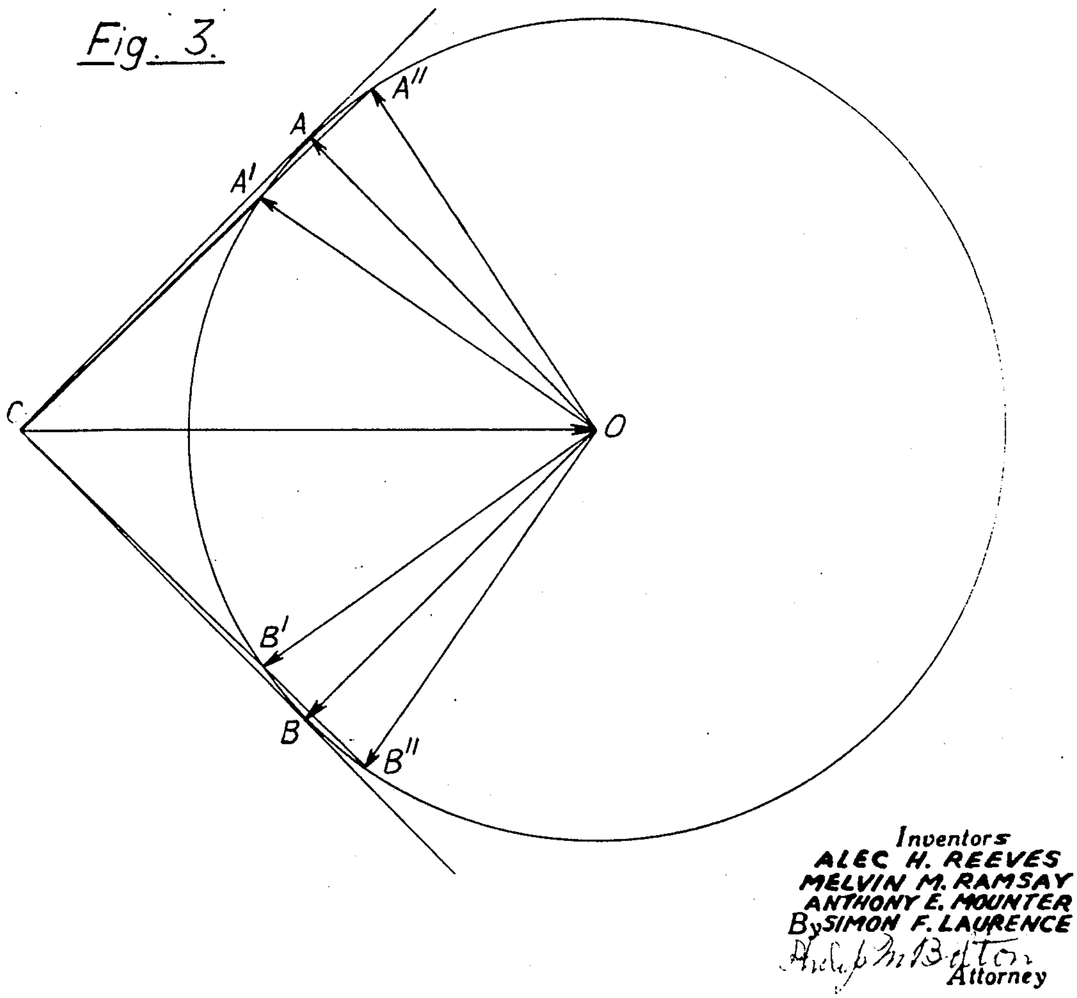
FIG. 3 is a vector diagram illustrating a manner in which the phases of pulses may be reconstituted at a repeater for a transmission system in which the phase separation between unlike digits is $\pi/2$.

In FIG. 3 the correct phases of input pulses corresponding to 1's and 0's are represented respectively by the vectors OA and OB. In practice however these pulses are contaminated by noise giving rise to amplitude and phase jitter. The amplitude jitter is first removed by clipping so that the vectorial representation of the clipped 1's and 0's pulses lie respectively in the range OA' to OA'' and OB' to OB''. These pulses are then mixed with a locally constituted signal whose phase and amplitude are given by the vector CO. The phase of this vector CO is chosen to be mid-way between the phases of the two vectors OA and OB and its amplitude is chosen to be $\sqrt{2}$ times the amplitude of the clipped input pulses. In this way small errors in phase as represented by the vectors OA', OA'', OB', and OB'' are virtually completely transformed into amplitude jitter represented by vectors CA', CA'', CB' and CB'', which may be eliminated by subsequent high level clipping. Thus, for example, if the rms signal to noise ratio of the input is 20 dB, the rms phase jitter associated with this noise amounts to about 4.3°, which this system then reduces to about 10 minutes of arc. It will be noticed that an ancillary effect of this phase jitter removal is the reversal of the phase difference between 0's and 1's, so that if a 1 leads a 0 by $\pi/2$ before the removal of phase jitter it will lag by $\pi/2$ afterwards, and vice versa.

Figure 4:
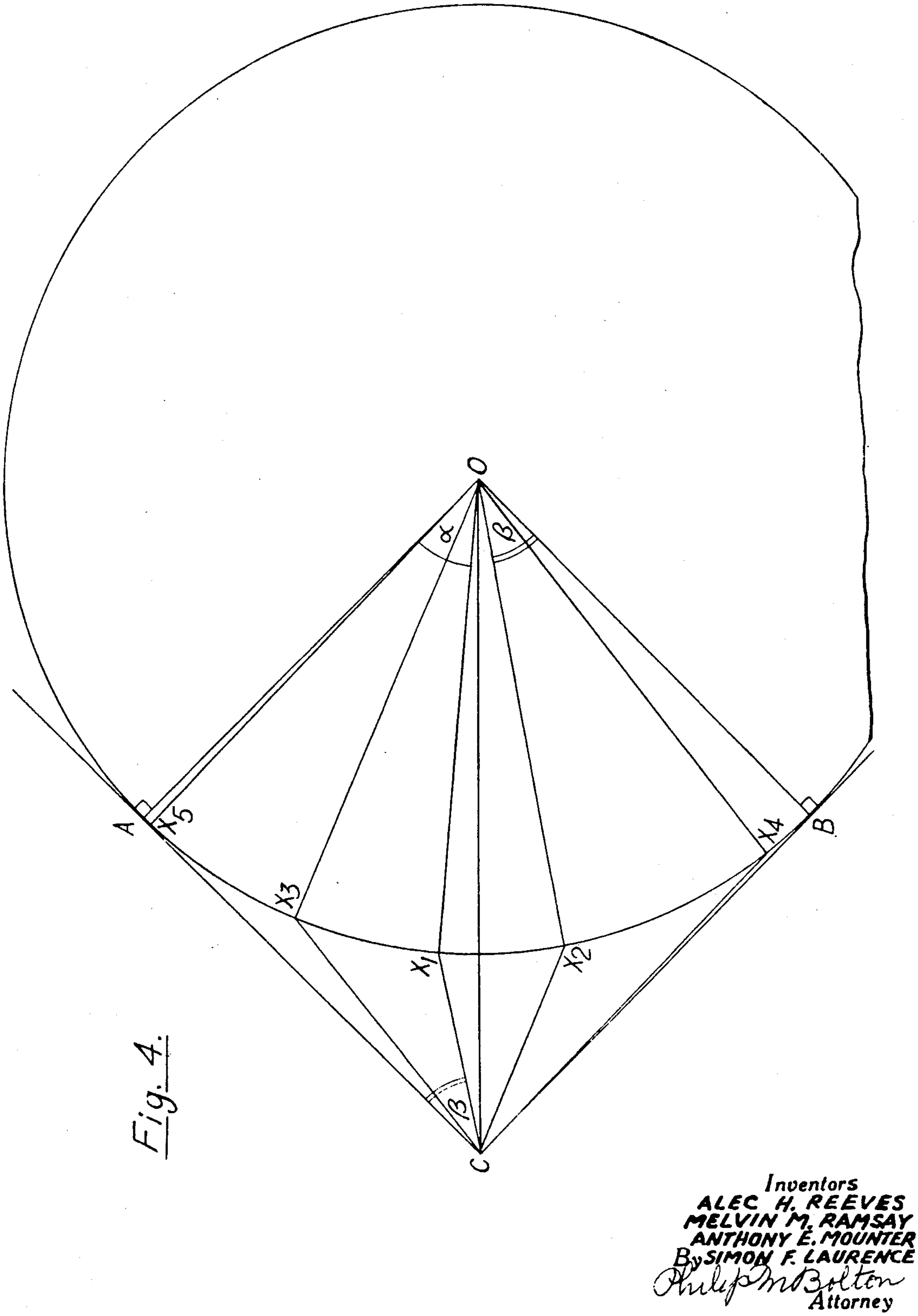
FIG. 4 is a vector diagram illustrating how the correction afforded by means described with reference to FIG. 3 is cumulative through a succession of repeaters.

FIG. 4 shows that if the phase error is comparatively large, but still less than $\pi/4$, a single repeater incorporating this method of phase angle correction will not completely eliminate phase error. Thus if the initial phase error is represented by the angle $X_1OA = \alpha$ then the phase error in the output of this repeater will be given by the angle $X_1CA = \beta$. However if this signal then passes through a cascade of repeaters the correction is improved at each stage. Thus the phase error of $\beta$ will appear at the next repeater as the angle $X_2OB$. At the third, fourth and fifth repeaters the phase error is given by the angles $X_3OA$, $X_4OB$, and $X_5OB$ respectively. Phase error correction is thus seen to be cumulative provided that the error nowhere exceeds $\pi/4$.

Figure 5:
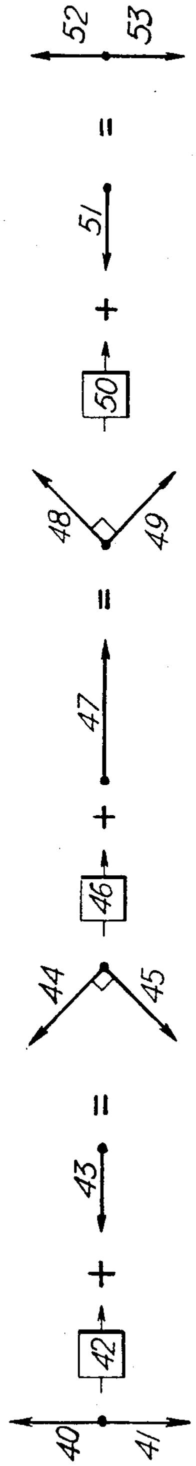
FIG. 5 is a flow diagram illustrating pulse phase reconstitution for a transmission system in which the phase separation between unlike digits is $\pi$.

An improvement upon this can be made by employing a transmission system in which the 1's and 0's are transmitted with a phase separation of $\pi$. Thus the system to be described with reference to FIG. 4 provides phase error correction which is cumulative provided that the error nowhere exceeds $\pi/2$. The essence of this system is that the phase separation of unlike digits is first transformed from $\pi$ to $\pi/2$; then the signals are treated in the same manner as described above with reference to FIG. 3; and finally the signals are re-converted back to having their original phase separation of $\pi$ between unlike digits. FIG. 5 is a vectorial flow diagram of this system. The incoming signals, which have a nominal phase separation of $\pi$ between unlike digits, are subject to amplitude and phase jitter and, dependent upon their nominal phase, are represented either by the vector 40 or the vector 41. These incoming signals first pass through a high level clipper 42 to remove amplitude jitter and are then mixed with a locally constituted signal whose amplitude and phase are represented by the vector 43. The resultant of this mixing is a signal which is subject to amplitude and phase jitter and which, dependent upon the nominal phase of the input, is represented either by the vector 44 or by the vector 45. The amplitude jitter is removed at 46 by high level clipping and then the signal is mixed with a second locally constituted signal whose amplitude and phase are represented by the vector 47. The resultant of this mixing is a signal which is subject to amplitude jitter but which has a substantially reduced phase jitter. This signal which, dependent upon the nominal phase of the input, is represented by either the vector 48 or the vector 49, is passed through a high level clipper 50 to remove amplitude jitter before being mixed with a third locally constituted signal whose amplitude and phase are represented by the vector 51. The resultant of this mixing is a signal which is substantially free of amplitude or phase jitter and which, dependent upon the nominal phase of the input, is represented either by the vector 52 or by the vector 53. Thus it is seen that the effect of the addition of the first locally constituted signal is to transform the nominal phase separation of unlike digits from $\pi$ to $\pi/2$, the effect of the second is to reduce phase errors, and the effect of the third is to restore the original phase separation of $\pi$. If a relatively large phase error is encountered it will not be completely removed by just one repeater, but successive repeaters will co-operate in its removal.

Since the phase of a signal can only be measured with respect to some form of datum point provided by a notional reference wave the transmission of information by phase modulation requires also the transmission of the reference signals from which from which a local reference wave in phase with the notional reference wave can be reconstructed. It is convenient to transmit this reference signal over the same channel as the modulated signals so that any slow random changes of path length occurring in the transmission system do not introduce phase errors because they affect equally both the modulated signals and the reference signals.

One method of providing the required reference signal is to use a transmission system in which pulses are transmitted down the system at regular intervals, some of these pulses being used to convey the reference signal while the remainder convey information. The synchronizing pulses, those conveying the reference signal, should preferably occur at regular intervals, for example one pulse in ten.

The repeater is designed to operate in a transmission system in which consecutive pulses are separated by n modulated signal pulses. For the purposes of the ensuing description the synchronizing pulses will be designated as occupying position $p_0$ in the pulse train, the first modulated signal pulse occurring after each synchronizing pulse will be designated as occupying position $p_1$, the second as occupying position $p_2$, and so on till the pulses designated as $p_{position}$ $P_n$, which are those occurring next before each synchronizing pulse.

If a repeater is required to reconstitute the phases of the pulses that it receives in the manner described above it will be necessary for it to be equipped with means for distinguishing the synchronizing pulses from the modulated signal pulses, and for using these pulses to construct a local reference wave which is in phase with the notional reference wave. For this purpose the transmission system employs a code incorporating a form of periodic symbol inversion which produces the condition that the probability that a pulse in position $p_x$ (where $1 \leq X \leq n$) has the same phase as the preceding pulse in position $p_x$ is approximately one half. This is to be contrasted with the probability of unity that a pulse in position $p_O$ (a synchronizing pulse) has the same phase as the preceding pulse in position $p_O$.

It will now be shown that under these conditions the synchronizing pulses can be separated from the others by means of a Fabry Perot etalon whose fundamental resonance is equal to the p.r.f. of the synchronizing pulses. It will be apparent that when such an etalon is placed in the path of the pulses a pulse arriving in position $p_x$ only interferes with preceding pulses occupying position $p_x$, and there is no interaction between it and any pulses occupying position $p_y$ ($y \neq x$). Considering first the synchronizing pulses: these all have the same phase, the cavity is resonant, and so energy is accepted from the incident light, the bulk of which is transmitted through the etalon. On the other hand pulses occupying position $p_x$ ($1 \leq X \leq n$) can be divided into two groups according to phase. The individual members of each group would interfere constructively with each other in the same manner as the synchronizing pulses, but since the numbers in each group are approximately equal and their phases are opposite, the etalon will reflect almost all the incident energy contained in these pulses. It is seen therefore that the effect of this etalon is to transmit the synchronizing pulses with little attenuation while the majority of the energy in the modulated signal pulses is reflected. For two reasons it is desirable to make the Q of this etalon as great as possible, firstly so that the discrimination between synchronizing pulses and the others is enhanced, and secondly so that the phase of the transmitted pulse shall be the average of as many as possible of the synchronizing pulses. In this way the phase noise of the individual outgoing pulses of the etalon is reduced in comparison with the phase noise of the individual incoming synchronizing pulses.

An alternative method of separating the synchronizing pulses from the others is to use part of the incoming signal as a trigger for an SQSR oscillator whose free running p.r.f. is slightly lower than the synchronizing pulse p.r.f. The magnitude of this trigger signal is arranged to be just insufficient on its own to cause the SQSR oscillator to lock. In these circumstances the firing of this oscillator will be roughly coincident with one pulse position, $p_x$ say, for a number of cycles before drifting on to be roughly coincident with the next pulse position $p_{x+1}$. Provided that it can be arranged that when the SQSR oscillator fires during the occurrence of a trigger pulse it fires with the same phase as that trigger pulse even if it is not locked to that pulse, the output of the SQSR oscillator can be employed to provide a feedback signal which will cause the oscillator to lock on to the synchronizing pulses. For this purpose the output from the SQSR oscillator is fed to a Fabry Perot etalon which is resonant at the frequency of the light. Conveniently the fundamental resonance of this etalon may be made equal to the p.r.f. of the synchronizing pulses or to a low harmonic of this frequency. The output of this Fabry Perot etalon is led round to provide an auxiliary trigger to augment the trigger derived from the incoming signal. When the SQSR oscillator is free running but happens to be firing in rough synchronism with pulses in position $p_x$ ($1 \leq X \leq n$) the phases of the pulses that it emits will tend to alternate because of the periodic symbol inversion. Hence the etalon will reflect the bulk of the energy of the pulses and the auxiliary trigger will have virtually zero amplitude. Consequently the SQSR oscillator will continue to drift through rough synchronism through the various pulse positions until, after passing through synchronism with pulse position $p_n$, it comes into rough synchronism with pulse position $p_O$. Then, on account of the fact that all the pulses are of the same phase, the amplitude of the auxiliary trigger signal begins to rise, and in augmenting the trigger from the incoming synchronizing pulses causes the SQSR to lock on to these pulses. Should anything happen to disturb the locking and cause the oscillator to begin to fire in synchronism with one of the modulated signal pulses, the next trigger pulse to arrive with the opposite phase to that of the synchronizing pulses will not be augmented by the auxiliary trigger, but instead will be diminished by it. If this alone is not sufficient to cause the immediate unlocking of the oscillator it will unlock soon afterward on account of the decay of the auxiliary trigger signal resulting from the Fabry Perot etalon being supplied with pulses of alternating phases.

There is no need for a continuous wave local reference wave to be reconstructed at each repeater since the locally generated signals employed in reconstituting the phases of the pulses are only employed during the duration of the pulses. Therefore it is sufficient to feed the synchronizing pulses to a second Fabry Perot etalon whose fundamental resonance is equal to the overall p.r.f. of the system. Light from a single synchronizing pulse will be reflected back and forth in this etalon $(n+1)$ times before the arrival of the next synchronizing pulse. Each of the times that the light is reflected at the distant mirror of the etalon some of the light will be transmitted. Thus the transmitted light will have $(n + 1)$ times the p.r.f. of the incident light. This will then produce output pulses with the required p.r.f. There will necessarily be a certain amount of droop in pulse amplitude of the output between consecutive synchronizing pulses, but if this droop becomes significant it can be simply remedied by using the signal to trigger another SQSR oscillator.

One of the problems encountered in the design of an optical repeater is the elimination of spurious feedback paths whose occurrence is attributable to the fact that the majority of optical devices are bidirectional. Spurious feedback of this sort can be eliminated by the use of Faraday isolators, but an alternative solution in the form of attenuators can sometimes be used in their place with a consequent saving in cost and alignment problems. The use of these attenuators relies on the fact that an SQSR device may have a gain of the order of 60 dB, and that for only a small proportion of time is it capable of being triggered by an input pulse. Thus isolation between SQSR devices connected in cascade can be achieved with attenuators placed between each device provided that the path lengths between consecutive devices are chosen such that a signal travelling in the reverse direction arrives at the wrong time to trigger the preceding device. It will be evident that although such light will not trigger the device, a significant proportion of it would in normal circumstances be reflected by it and so be able to travel further in the reverse direction. An improvement in isolation would therefore be effected by reducing the reflectivity of SQSR devices. The normal quarter wavelength anti-reflection layer is not suitable for this purpose as this would seriously lower the Q of the device. What is required therefore is a form of blooming which provides the SQSR device with a low reflectivity while the device is well below lasing threshold, but provides it with a high reflectivity once this threshold is reached. One method of producing a variable reflectivity of this type on one end of a semiconductor laser is provided by coating it with a half wavelength thickness layer of a transparent dielectric whose refractive index matches the real part of the refractive index of the laser, and then depositing a high reflectivity multilayer stack on top of the half wavelength thickness layer. With this arrangement, when the laser reaches threshold there is no reflection at the interface between the laser material and the half wavelength thickness layer because the two refractive indices are matched. On the other hand when the laser is well below the threshold the laser material is strongly attenuating to light at the laser wavelength, and so its refractive index is complex and has a large imaginary component. Therefore when the laser is well below threshold there is a refractive index mismatch at the interface between these layers giving rise to a substantial reflectivity.

Therefore the addition of these layers to a laser has virtually no effect upon its performance while it is above lasing threshold as all that the layers accomplish is to lengthen the cavity by half a wavelength. On the other hand when the laser is beneath threshold the layers look like an interference transmission filter employing a half wavelength dielectric spacer, and therefore, in spite of the high reflectivity stack, a significant proportion of energy incident upon the layers would be transmitted through them to be absorbed in the laser material. The half wavelength layer may be made of aluminium doped gallium arsenide.

The layout of a complete repeater adapted for a transmission system having a phase separation of $\pi$ between unlike digits will now be described with reference to FIG. 6. The input to the repeater is at 61, from where incident light by a beam splitter 62 into an SQSR device 63 which acts as an input pulse amplifier and high level clipper. Part of the output of the light from the SQSR device 63 which is transmitted through the beam splitter 62 is deflected by beam splitter 64 into a Fabry Perot etalon 65 whose fundamental resonance is equal to the p.r.f. of the synchronizing pulses. As explained previously this etalon 65 acts as a kind of filter which allows the synchronizing pulses to be transmitted through it, but blocks the other pulses. These synchronizing pulses are then fed to a further Fabry Perot etalon, indicated at 66, whose fundamental resonance is equal to the overall p.r.f. of the transmission system. As explained previously the output of this etalon is a set of reference pulses in phase with the notional reference wave and having a p.r.f. equal to the overall p.r.f. of the transmission system. By virtue of the averaging effects of both these etalons 65 and 66 the reference pulses have less phase noise than the individual synchronizing pulses. These reference pulses are directed by means of a beam splitter 67 into an SQSR device 68 to eliminate any droop in amplitude of reference pulses between consecutive synchronizing pulses The output of this SQSR device 68 is then fed to the series combination of two beam splitters 69 and 70 to provide the three locally constituted signals *a*, *b*, and *c*, of appropriate phase and amplitude required for the reconstitution by the repeater of the phases of the incoming pulses. The appropriate phases are produced at the required places by suitable choice of optical path lengths. The first locally constituted signal, *a*, is derived from the transmitted fraction of the light incident from the SQSR device 68 upon the beam splitter 70, and is superimposed by means of a beam splitter 71 on the output from the SQSR device 63, and the resultant is directed by means of a beam splitter 72 into a SQSR device 73. The superimposing of this first locally constituted signal converts the phase separation between unlike digits from $\pi$ to $\pi/2$, while the SQSR device 73 is employed as a high level clipper to remove any amplitude jitter resulting from phase jitter in the signals from the SQSR device 63. The second locally constituted signal, *b*, is derived from the reflected fraction of the light from the SQSR device 68 incident upon the beam splitter 70, and is superimposed by means of a beam splitter 74 on the output from the SQSR device 73, and the resultant is directed by means of a beam splitter 75 into an SQSR device 76. The superimposing of this second locally constituted signal serves to reduce or substantially eliminate phase jitter in the signals received from the SQSR device 73, transforming it into amplitude jitter which is removed by the high level clipping action of the SQSR device 76. As has been explained above, an incidental effect of this superimposing of the second locally constituted signal is the phase reversal of the digits. The third locally constituted signal, *c*, is derived from the transmitted fraction of the light from the SQSR device 68 incident upon the beam splitter 69, and is superimposed by means of a beam splitter 77 on the output from the SQSR device 76. The super-imposing of this third locally constituted signal converts the phase separation between unlike digits from $\pi/2$ back to $\pi$ again, and the resultant provides the output from the repeater at 78.

Figure 6:
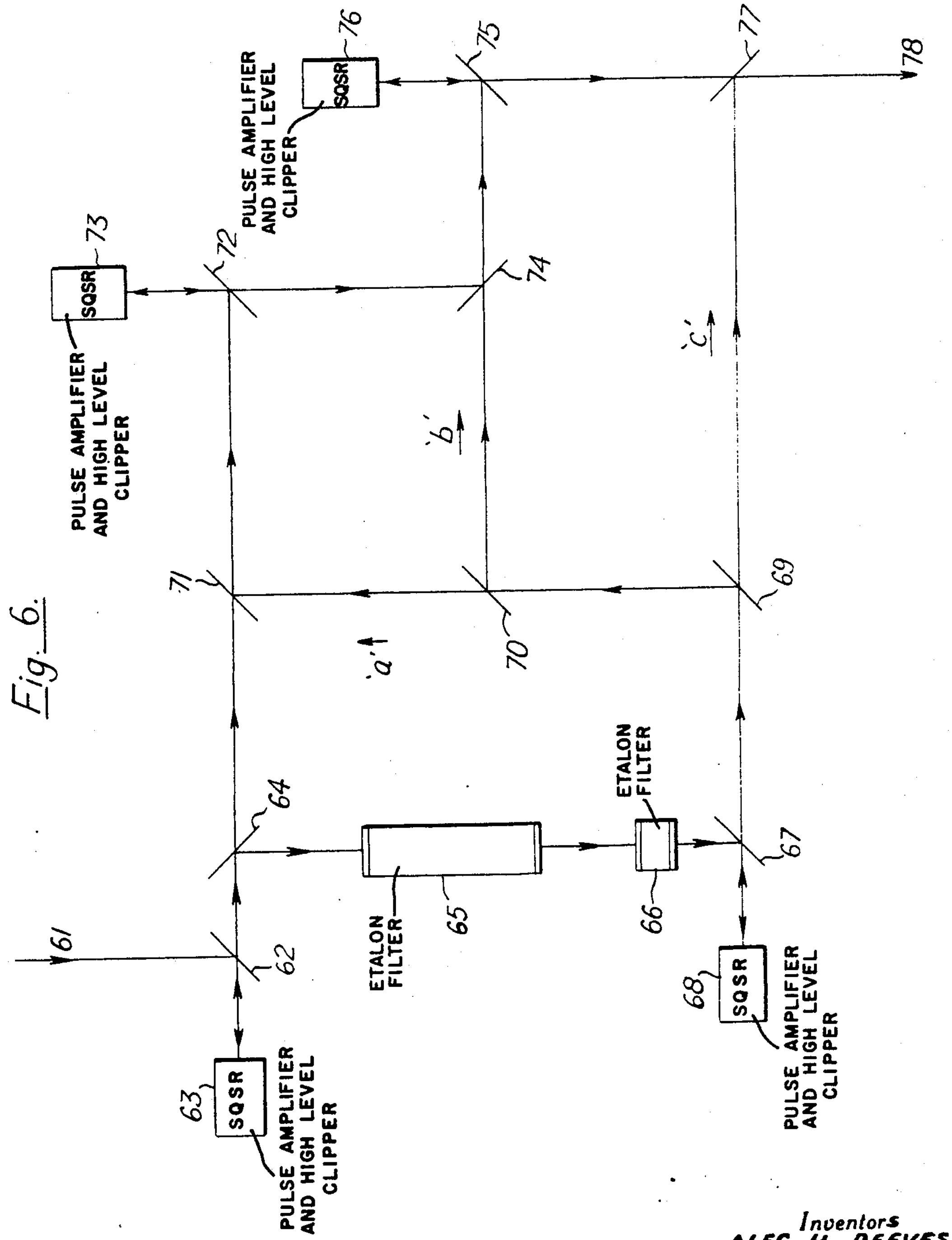
FIG. 6 is a diagram of an optical repeater for a transmission system in which the phase separation between unlike digits is $\pi$.

Details of optical isolators for preventing unwanted feedback have not been shown in FIG. 6, but it will be evident that a good measure of isolation is required at at least three places in the repeater. This isolation is most obviously necessary to prevent back streaming of light into the Fabry Perot etalon 66. Isolation is further required to decouple the two Fabry Perot etalons 65 and 66 so that the operation of etalon 66 shall not affect the operation of etalon 65. Isolation is also required either before the first element of the repeater or after the last, because it is unlikely that the optical path length between consecutive repeaters would be held to a sufficiently close tolerance to ensure that any light pulses travelling between repeaters in the reverse direction will arrive back at the wrong time to trigger any of the SQSR devices of the earlier repeater.

The final receiver of the transmission system is similar to the repeater described with reference to FIG. 6 with the exceptions that signal 78 is detected by a photodetector, and that the third locally constituted signal (signal *c*) has a different phase and amplitude, chosen so that the superimposing of this signal by means of beam splitter 77 causes the removal by destructive interference of the pulses corresponding to one type of digit from the signal 78 while merely causing a phase shift in pulses corresponding to the other type of digit.

We claim:

1. A phase modulated pulsed carrier wave transmission system for conveying binary information in the form of pulses such that the significance of each signal pulse is represented by the phase of the carrier within the envelope of that pulse measured with respect to a reference wave of the same frequency as that of the carrier, comprising:

- a optical source of a signal pulse train having synchronizing pulses interspersed at regular intervals with information pulses, said synchronizing pulses all having the same phase; and
- at least one optical repeater for regenerating said pulse train further comprising:
  - at least one self-quenching super-regenerative oscillator to perform high level clipping; and
  - means for transforming a portion of the phase jitter of the incoming pulses into amplitude jitter which is then eliminated by said high level clipping.

2. A transmission system according to claim 1 wherein the frequency of the carrier wave is within the optical range of frequencies.

3. A transmission system according to claim 5 wherein said first, second and third high level clippers are provided by self-quenching super-regenerative oscillators.

4. A transmission system according to claim 3 wherein said repeater further comprises a feedback loop including:

- a first Fabry Perot etalon whose fundamental resonant frequency is equal to the synchronizing pulse repetition frequency such that part of the incoming pulse train is incident normally upon it whereby portions of the locally constituted frequency wave are caused to emanate from said first Fabry Perot etalon with a periodicity equal to the synchronizing pulse repetition frequency, a proportion of which is used as an auxiliary trigger for said oscillator; and
- a second Fabry Perot etalon whose resonant frequency is equal to the overall pulse repetition frequency arranged such that a proportion of the output of said first Fabry Perot etalon is incident normally upon it whereby a reference wave with a periodicity equal to the overall pulse repetition frequency of the system is produced.

5. A transmission system according to claim 2 wherein said repeater includes:

- a first high level clipper stage optically coupled to said optical source for removing amplitude jitter from the incoming signal;
- a first source of first and second locally constituted signals;
- first means optically coupled to said first high level clipper and to said first source for superimposing said first locally constituted signal on the output of said first high level clipper and converting the phase angle separation between unlike incoming signal pulses from an original value to $\pi/2$;
- a second high level clipper optically coupled to said firs means for removing amplitude jitter resulting from phase jitter in the output of said first high level clipper;
- second means optically coupled to said first source and to said second high level clipper for superimposing said second locally constituted signal on the output of said second high level clipper and reversing the relative phase separation between unlike signal pulses;
- a third high level clipper optically coupled to said second means for removing amplitude jitter resulting from phase jitter in the output of said second high level clipper;

a second source of a third locally constituted signal; and third means coupled to said third high level clipper and said second source for superimposing said third locally constituted signal on the output of said third high level clipper and restoring the phase angle separation between unlike signal pulses to the original non-reversed value.

* * * * *